(12) United States Patent
Chui et al.

(10) Patent No.: US 7,724,993 B2
(45) Date of Patent: May 25, 2010

(54) MEMS SWITCHES WITH DEFORMING MEMBRANES

(75) Inventors: Clarence Chui, San Mateo, CA (US); Manish Kothari, Cupertino, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 1016 days.

(21) Appl. No.: 11/198,925

(22) Filed: Aug. 5, 2005

(65) Prior Publication Data

US 2006/0067648 A1    Mar. 30, 2006

Related U.S. Application Data

(60) Provisional application No. 60/613,465, filed on Sep. 27, 2004, provisional application No. 60/613,501, filed on Sep. 27, 2004.

(51) Int. Cl.
*G02B 6/42* (2006.01)
*H01H 59/00* (2006.01)

(52) U.S. Cl. .......................... 385/22; 200/181
(58) Field of Classification Search .................. 385/22; 200/181
See application file for complete search history.

(56) References Cited

U.S. PATENT DOCUMENTS

| | | | |
|---|---|---|---|
| 3,982,239 A | 9/1976 | Sherr | |
| 4,403,248 A | 9/1983 | te Velde | |
| 4,425,572 A | 1/1984 | Takafuji et al. | |
| 4,441,791 A | 4/1984 | Hornbeck | |
| 4,459,182 A | 7/1984 | te Velde | |
| 4,482,213 A | 11/1984 | Piliavin et al. | |
| 4,500,171 A | 2/1985 | Penz et al. | |
| 4,519,676 A | 5/1985 | te Velde | |
| 4,566,935 A | 1/1986 | Hornbeck | |
| 4,571,603 A | 2/1986 | Hornbeck et al. | |
| 4,596,992 A | 6/1986 | Hornbeck | |
| 4,615,595 A | 10/1986 | Hornbeck | |
| 4,662,746 A | 5/1987 | Hornbeck | |
| 4,681,403 A | 7/1987 | te Velde et al. | |
| 4,709,995 A | 12/1987 | Kuribayashi et al. | |
| 4,710,732 A | 12/1987 | Hornbeck | |
| 4,856,863 A | 8/1989 | Sampsell et al. | |
| 4,859,060 A | 8/1989 | Katagiri et al. | |
| 4,954,789 A | 9/1990 | Sampsell | |
| 4,956,619 A | 9/1990 | Hornbeck | |

(Continued)

FOREIGN PATENT DOCUMENTS

EP    0295802 A    12/1988

(Continued)

OTHER PUBLICATIONS

Peroulis et al., Low contact resistance series MEMS switches, 2002, pp. 223-226, vol. 1, IEEE MTT-S International Microwave Symposium Digest, New York, NY.

(Continued)

*Primary Examiner*—Jerry T Rahll
(74) *Attorney, Agent, or Firm*—Knobbe Martens Olson & Bear LLP

(57) ABSTRACT

MEMS switches are formed with membranes or layers that are deformable upon the application of a voltage. In some embodiments, the application of a voltage opens switch contacts.

40 Claims, 13 Drawing Sheets

U.S. PATENT DOCUMENTS

| | | | |
|---|---|---|---|
| 4,982,184 A | 1/1991 | Kirkwood |
| 5,018,256 A | 5/1991 | Hornbeck |
| 5,028,939 A | 7/1991 | Hornbeck et al. |
| 5,037,173 A | 8/1991 | Sampsell et al. |
| 5,055,833 A | 10/1991 | Hehlen et al. |
| 5,061,049 A | 10/1991 | Hornbeck |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,142,405 A | 8/1992 | Hornbeck |
| 5,142,414 A | 8/1992 | Koehler et el. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,227,900 A | 7/1993 | Inaba et al. |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,287,215 A | 2/1994 | Warde et al. |
| 5,296,950 A | 3/1994 | Lin et al. |
| 5,305,640 A | 4/1994 | Boysel et al. |
| 5,312,513 A | 5/1994 | Florence et al. |
| 5,323,002 A | 6/1994 | Sampsell et al. |
| 5,325,116 A | 6/1994 | Sampsell |
| 5,327,286 A | 7/1994 | Sampsell et al. |
| 5,331,454 A | 7/1994 | Hornbeck |
| 5,339,116 A | 8/1994 | Urbanus et al. |
| 5,365,283 A | 11/1994 | Doherty et al. |
| 5,367,878 A | 11/1994 | Muntz et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,461,411 A | 10/1995 | Florence et al. |
| 5,488,505 A | 1/1996 | Engle |
| 5,489,952 A | 2/1996 | Gove et al. |
| 5,497,172 A | 3/1996 | Doherty et al. |
| 5,497,197 A | 3/1996 | Gove et al. |
| 5,499,062 A | 3/1996 | Urbanus |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,563,398 A | 10/1996 | Sampsell |
| 5,567,334 A | 10/1996 | Baker et al. |
| 5,570,135 A | 10/1996 | Gove et al. |
| 5,578,976 A | 11/1996 | Yao |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,598,565 A | 1/1997 | Reinhardt |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,612,713 A | 3/1997 | Bhuva et al. |
| 5,619,061 A | 4/1997 | Goldsmith et al. |
| 5,619,365 A | 4/1997 | Rhoades et al. |
| 5,619,366 A | 4/1997 | Rhoads et al. |
| 5,629,790 A | 5/1997 | Neukermans et al. |
| 5,633,652 A | 5/1997 | Kanbe et al. |
| 5,636,052 A | 6/1997 | Arney et al. |
| 5,638,084 A | 6/1997 | Kalt |
| 5,638,946 A | 6/1997 | Zavracky |
| 5,646,768 A | 7/1997 | Kaeiyama |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,745,193 A | 4/1998 | Urbanus et al. |
| 5,745,281 A | 4/1998 | Yi et al. |
| 5,754,160 A | 5/1998 | Shimizu et al. |
| 5,771,116 A | 6/1998 | Miller et al. |
| 5,784,189 A | 7/1998 | Bozler et al. |
| 5,784,212 A | 7/1998 | Hornbeck |
| 5,808,780 A | 9/1998 | McDonald |
| 5,818,095 A | 10/1998 | Sampsell |
| 5,835,255 A | 11/1998 | Miles |
| 5,842,088 A | 11/1998 | Thompson |
| 5,867,302 A | 2/1999 | Fleming et al. |
| 5,912,758 A | 6/1999 | Knipe et al. |
| 5,943,158 A | 8/1999 | Ford et al. |
| 5,946,176 A | 8/1999 | Ghoshal |
| 5,959,763 A | 9/1999 | Bozler et al. |
| 5,966,235 A | 10/1999 | Walker et al. |
| 5,986,796 A | 11/1999 | Miles |
| 6,028,690 A | 2/2000 | Carter et al. |
| 6,038,056 A | 3/2000 | Florence et al. |
| 6,040,937 A | 3/2000 | Miles |
| 6,049,317 A | 4/2000 | Thompson et al. |
| 6,055,090 A | 4/2000 | Miles |
| 6,061,075 A | 5/2000 | Nelson et al. |
| 6,099,132 A | 8/2000 | Kaeriyama |
| 6,100,872 A | 8/2000 | Aratani et al. |
| 6,113,239 A | 9/2000 | Sampsell et al. |
| 6,143,997 A * | 11/2000 | Feng et al. .................. 200/181 |
| 6,147,790 A | 11/2000 | Meier et al. |
| 6,160,833 A | 12/2000 | Floyd et al. |
| 6,180,428 B1 | 1/2001 | Peeters et al. |
| 6,201,633 B1 | 3/2001 | Peeters et al. |
| 6,232,936 B1 | 5/2001 | Gove et al. |
| 6,275,326 B1 | 8/2001 | Bhalla et al. |
| 6,282,010 B1 | 8/2001 | Sulzbach et al. |
| 6,295,154 B1 | 9/2001 | Laor et al. |
| 6,304,297 B1 | 10/2001 | Swan |
| 6,310,339 B1 | 10/2001 | Hsu et al. |
| 6,323,982 B1 | 11/2001 | Hornbeck |

| | | |
|---|---|---|
| 6,327,071 B1 | 12/2001 | Kimura |
| 6,356,085 B1 | 3/2002 | Ryat et al. |
| 6,356,254 B1 | 3/2002 | Kimura |
| 6,376,787 B1 | 4/2002 | Martin et al. |
| 6,429,601 B1 | 8/2002 | Friend et al. |
| 6,433,917 B1 | 8/2002 | Mei et al. |
| 6,447,126 B1 | 9/2002 | Hornbeck |
| 6,465,355 B1 | 10/2002 | Horsley |
| 6,466,358 B2 | 10/2002 | Tew |
| 6,473,274 B1 | 10/2002 | Maimone et al. |
| 6,480,177 B2 | 11/2002 | Doherty et al. |
| 6,496,122 B2 | 12/2002 | Sampsell |
| 6,501,107 B1 | 12/2002 | Sinclair et al. |
| 6,507,330 B1 | 1/2003 | Handschy et al. |
| 6,507,331 B1 | 1/2003 | Schlangen et al. |
| 6,529,654 B1 | 3/2003 | Wong et al. |
| 6,545,335 B1 | 4/2003 | Chua et al. |
| 6,548,908 B2 | 4/2003 | Chua et al. |
| 6,549,338 B1 | 4/2003 | Wolverton et al. |
| 6,552,840 B2 | 4/2003 | Knipe |
| 6,574,033 B1 | 6/2003 | Chui et al. |
| 6,589,625 B1 | 7/2003 | Kothari et al. |
| 6,593,934 B1 | 7/2003 | Liaw et al. |
| 6,600,201 B2 | 7/2003 | Hartwell et al. |
| 6,606,175 B1 | 8/2003 | Sampsell et al. |
| 6,625,047 B2 | 9/2003 | Coleman, Jr. |
| 6,630,786 B2 | 10/2003 | Cummings et al. |
| 6,632,698 B2 | 10/2003 | Ives |
| 6,643,069 B2 | 11/2003 | Dewald |
| 6,650,455 B2 | 11/2003 | Miles |
| 6,666,561 B1 | 12/2003 | Blakley |
| 6,674,090 B1 | 1/2004 | Chua et al. |
| 6,674,562 B1 | 1/2004 | Miles |
| 6,680,792 B2 | 1/2004 | Miles |
| 6,710,908 B2 | 3/2004 | Miles et al. |
| 6,741,377 B2 | 5/2004 | Miles |
| 6,741,384 B1 | 5/2004 | Martin et al. |
| 6,741,503 B1 | 5/2004 | Farris et al. |
| 6,747,785 B2 | 6/2004 | Chen et al. |
| 6,762,873 B1 | 7/2004 | Coker et al. |
| 6,775,174 B2 | 8/2004 | Huffman et al. |
| 6,778,155 B2 | 8/2004 | Doherty et al. |
| 6,781,643 B1 | 8/2004 | Watanabe et al. |
| 6,787,384 B2 | 9/2004 | Okumura |
| 6,787,438 B1 | 9/2004 | Nelson |
| 6,788,520 B1 | 9/2004 | Behin et al. |
| 6,794,119 B2 | 9/2004 | Miles |
| 6,811,267 B1 | 11/2004 | Allen et al. |
| 6,813,060 B1 | 11/2004 | Garcia et al. |
| 6,819,469 B1 | 11/2004 | Koba |
| 6,822,628 B2 | 11/2004 | Dunphy et al. |
| 6,829,132 B2 | 12/2004 | Martin et al. |
| 6,853,129 B1 | 2/2005 | Cummings et al. |
| 6,855,610 B2 | 2/2005 | Tung et al. |
| 6,859,218 B1 | 2/2005 | Luman et al. |
| 6,861,277 B1 | 3/2005 | Monroe et al. |
| 6,862,022 B2 | 3/2005 | Slupe |
| 6,862,029 B1 | 3/2005 | D'Souza et al. |
| 6,867,896 B2 | 3/2005 | Miles |
| 6,870,581 B2 | 3/2005 | Li et al. |
| 6,903,860 B2 | 6/2005 | Ishii |
| 6,972,881 B1 | 12/2005 | Bassetti |
| 7,034,783 B2 | 4/2006 | Gates et al. |
| 7,123,216 B1 | 10/2006 | Miles |
| 7,161,728 B2 | 1/2007 | Sampsell et al. |
| 7,196,837 B2 | 3/2007 | Sampsell et al. |
| 7,343,080 B2 * | 3/2008 | Gally et al. .................. 385/147 |
| 7,489,228 B2 | 2/2009 | Robert |
| 2001/0003487 A1 | 6/2001 | Miles |
| 2001/0034075 A1 | 10/2001 | Onoya |
| 2001/0043171 A1 | 11/2001 | Van Gorkom et al. |
| 2001/0046081 A1 | 11/2001 | Hayashi et al. |
| 2001/0051014 A1 | 12/2001 | Behin et al. |
| 2002/0000959 A1 | 1/2002 | Colgan et al. |
| 2002/0005827 A1 | 1/2002 | Kobayashi |
| 2002/0012159 A1 | 1/2002 | Tew |
| 2002/0015215 A1 | 2/2002 | Miles |
| 2002/0024711 A1 | 2/2002 | Miles |
| 2002/0036304 A1 | 3/2002 | Ehmke et al. |
| 2002/0050882 A1 | 5/2002 | Hyman et al. |
| 2002/0054424 A1 | 5/2002 | Miles et al. |
| 2002/0075226 A1 | 6/2002 | Lippincott |
| 2002/0075555 A1 | 6/2002 | Miles |
| 2002/0093722 A1 | 7/2002 | Chan et al. |
| 2002/0097133 A1 | 7/2002 | Charvet et al. |
| 2002/0126364 A1 | 9/2002 | Miles |
| 2002/0179421 A1 | 12/2002 | Williams et al. |
| 2002/0186108 A1 | 12/2002 | Hallbjorner |
| 2003/0004272 A1 | 1/2003 | Power |
| 2003/0043157 A1 | 3/2003 | Miles |
| 2003/0072070 A1 | 4/2003 | Miles |
| 2003/0122773 A1 | 7/2003 | Washio et al. |
| 2003/0137215 A1 | 7/2003 | Cabuz |
| 2003/0137521 A1 | 7/2003 | Zehner et al. |
| 2003/0189536 A1 | 10/2003 | Ruigt |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0022044 A1 | 2/2004 | Yasuoka et al. |
| 2004/0027701 A1 | 2/2004 | Ishikawa |
| 2004/0051929 A1 | 3/2004 | Sampsell et al. |
| 2004/0058532 A1 | 3/2004 | Miles et al. |
| 2004/0080807 A1 | 4/2004 | Chen et al. |
| 2004/0145049 A1 | 7/2004 | McKinnell et al. |
| 2004/0147056 A1 | 7/2004 | McKinnell et al. |
| 2004/0160143 A1 | 8/2004 | Shreeve et al. |
| 2004/0174583 A1 | 9/2004 | Chen et al. |
| 2004/0179281 A1 | 9/2004 | Reboa |
| 2004/0212026 A1 | 10/2004 | Van Brocklin et al. |
| 2004/0217378 A1 | 11/2004 | Martin et al. |
| 2004/0217919 A1 | 11/2004 | Pichl et al. |
| 2004/0218251 A1 | 11/2004 | Piehl et al. |
| 2004/0218334 A1 | 11/2004 | Martin et al. |
| 2004/0218341 A1 | 11/2004 | Martin et al. |
| 2004/0223204 A1 | 11/2004 | Mao et al. |
| 2004/0227493 A1 | 11/2004 | Van Brocklin et al. |
| 2004/0240032 A1 | 12/2004 | Miles |
| 2004/0240138 A1 | 12/2004 | Martin et al. |
| 2004/0245588 A1 | 12/2004 | Nikkel et al. |
| 2004/0263944 A1 | 12/2004 | Miles et al. |
| 2005/0001828 A1 | 1/2005 | Martin et al. |
| 2005/0012577 A1 | 1/2005 | Pillans et al. |
| 2005/0038950 A1 | 2/2005 | Adelmann |
| 2005/0057442 A1 | 3/2005 | Way |
| 2005/0068583 A1 | 3/2005 | Gutkowski et al. |
| 2005/0069209 A1 | 3/2005 | Damera-Venkata et al. |
| 2005/0116924 A1 | 6/2005 | Sauvante et al. |
| 2005/0122560 A1 | 6/2005 | Sampsell et al. |
| 2005/0206991 A1 | 9/2005 | Chui et al. |
| 2005/0286113 A1 | 12/2005 | Miles |
| 2005/0286114 A1 | 12/2005 | Miles |
| 2006/0044246 A1 | 3/2006 | Mignard |
| 2006/0044298 A1 | 3/2006 | Mignard et al. |
| 2006/0044928 A1 | 3/2006 | Chui et al. |
| 2006/0056000 A1 | 3/2006 | Mignard |
| 2006/0057754 A1 | 3/2006 | Cummings |
| 2006/0066542 A1 | 3/2006 | Chui |
| 2006/0066559 A1 | 3/2006 | Chui et al. |
| 2006/0066560 A1 | 3/2006 | Gally et al. |
| 2006/0066561 A1 | 3/2006 | Chui et al. |
| 2006/0066594 A1 | 3/2006 | Tyger |
| 2006/0066597 A1 | 3/2006 | Sampsell |
| 2006/0066598 A1 | 3/2006 | Floyd |
| 2006/0066601 A1 | 3/2006 | Kothari |
| 2006/0066935 A1 | 3/2006 | Cummings et al. |

| | | | |
|---|---|---|---|
| 2006/0066937 | A1 | 3/2006 | Chui |
| 2006/0066938 | A1 | 3/2006 | Chui |
| 2006/0067653 | A1 | 3/2006 | Gally et al. |
| 2006/0077127 | A1 | 4/2006 | Sampsell et al. |
| 2006/0077505 | A1 | 4/2006 | Chui et al. |
| 2006/0077520 | A1 | 4/2006 | Chui et al. |
| 2006/0103613 | A1 | 5/2006 | Chui |

FOREIGN PATENT DOCUMENTS

| | | | |
|---|---|---|---|
| EP | 0300754 | A2 | 1/1989 |
| EP | 0306308 | A2 | 3/1989 |
| EP | 0318050 | A | 5/1989 |
| EP | 0 417 523 | A | 3/1991 |
| EP | 0 467 048 | A | 1/1992 |
| EP | 0570906 | A | 11/1993 |
| EP | 0608056 | A1 | 7/1994 |
| EP | 0655725 | A1 | 5/1995 |
| EP | 0 667 548 | A1 | 8/1995 |
| EP | 0 706 164 | | 4/1996 |
| EP | 0725380 | A1 | 8/1996 |
| EP | 0852371 | A1 | 7/1998 |
| EP | 0911794 | A1 | 4/1999 |
| EP | 0 017 038 | A | 7/2000 |
| EP | 1 146 533 | A | 10/2001 |
| EP | 1343190 | A | 9/2003 |
| EP | 1345197 | A | 9/2003 |
| EP | 1381023 | A | 1/2004 |
| EP | 1473691 | A2 | 11/2004 |
| GB | 2401200 | A | 11/2004 |
| JP | 2004-29571 | | 1/2004 |
| WO | WO 95/30924 | | 11/1995 |
| WO | WO 97/17628 | | 5/1997 |
| WO | WO 99/52006 | A3 | 10/1999 |
| WO | WO 01/73937 | A | 10/2001 |
| WO | WO 03/007049 | A1 | 1/2003 |
| WO | WO 03/015071 | A2 | 2/2003 |
| WO | WO 03/044765 | A2 | 5/2003 |
| WO | WO 03/060940 | A | 7/2003 |
| WO | WO 03/069413 | A1 | 8/2003 |
| WO | WO 03/073151 | A1 | 9/2003 |
| WO | WO 03/079323 | A | 9/2003 |
| WO | WO 03/090199 | A1 | 10/2003 |
| WO | WO 2004/006003 | A1 | 1/2004 |
| WO | WO 2004/026757 | A2 | 4/2004 |
| WO | WO 2004/049034 | A1 | 6/2004 |

OTHER PUBLICATIONS

Seeger et al., "Stabilization of Electrostatically Actuated Mechanical Devices", (1997) International Conference on Solid State Sensors and Actuators; vol. 2, pp. 1133-1136.

Bains, "Digital Paper Display Technology holds Promise for Portables", CommsDesign EE Times (2000).

Lieberman, "MEMS Display Looks to give PDAs Sharper Image" EE Times (2004).

Lieberman, "Microbridges at heart of new MEMS displays" EE Times (2004).

Miles, MEMS-based interferometric modulator for display applications, Part of the SPIE Conference on Micromachined Devices and Components, vol. 3876, pp. 20-28 (1999).

Miles et al., 5.3: Digital Paper™: Reflective displays using interferometric modulation, SID Digest, vol. XXXI, 2000 pp. 32-35.

ISR and WO for PCT/US05/032782 filed Sep. 14, 2005.

IPRP for PCT/US05/032782 filed Sep. 14, 2005.

* cited by examiner

|  | Column Output Signals | |
|---|---|---|
|  | $+V_{bias}$ | $-V_{bias}$ |
| Row Output Signals   0 | Stable | Stable |
| $+\Delta V$ | Relax | Actuate |
| $-\Delta V$ | Actuate | Relax |

MEMS SWITCHES WITH DEFORMING MEMBRANES

CROSS REFERENCE TO RELATED APPLICATIONS

This application claims priority to U.S. Provisional Application No. 60/613,465 titled "Method For and Electronic Devices Utilizing Microelectromechanical System," filed Sep. 27, 2004, and to U.S. Provisional Application No. 60/613,501, titled "Interferometric Modulator Array With Integrated MEMS Electrical Switches," filed Sep. 27, 2004, which are hereby incorporated by reference, in their entirety.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In one embodiment, the invention comprises a microelectromechanical systems (MEMS) switch including at least first and second terminals and a first electrode. The switch further includes a moveable element having at least a portion thereof forming a second electrode and being moveable in response to applied electric potentials between the second electrode and the first electrode. The first and second terminals are selectively connectable depending on the position of the moveable element, and a voltage below a threshold between the second and the first electrode causes the first and second terminals to be electrically connected.

In another embodiment, a microelectromechanical systems (MEMS) switch includes a deformable electrically conductive membrane having first and second major surfaces and an electrode opposite the first major surface of the membrane. The switch also includes a first switch terminal movable with the deformable membrane and a second switch terminal opposite the second major surface of the membrane. Membrane deformation toward the electrode in response to an applied electric field moves the first switch terminal and the second switch terminal farther apart.

In another embodiment, a method of opening a microelectromechanical systems (MEMS) switch includes disconnecting a first switch terminal from an established electrical coupling to a second switch terminal with an electric field.

In another embodiment, a microelectromechanical systems (MEMS) switch includes a movable element includes at least a first terminal and a first electrode on a first side of a gap and a second terminal. A second electrode on a second side of the gap is configured to move the movable element based on a potential difference applied to the first and second electrodes to selectively connect the first and second terminals.

In another embodiment, a microelectromechanical systems (MEMS) switch includes an element movable between first and second positions and includes first and second movable terminals. The first and second movable terminals cooperatively move with the movable element to connect the first and second movable terminals when the element is in the first position and to disconnect the first and second movable terminals when the element is in the second position.

In another embodiment, a microelectromechanical systems (MEMS) switch includes:

first and second switch terminals, means for maintaining electrical contact between the first and second switch terminals when the MEMS switch is in a mechanically relaxed state; and means for disconnecting the first and second switch terminals by applying a voltage difference to the MEMS switch greater than a threshold.

In another embodiment, a method of operating a microelectromechanical systems (MEMS) switch includes maintaining electrical contact between first and second switch terminals when the MEMS switch is in a mechanically relaxed state, and disconnecting the first and second switch terminals by creating an electric field between a pair of electrode surfaces of the MEMS switch.

Methods of manufacturing switches are also provided. In one such embodiment, the method includes forming an electrode and an insulator on a substrate and forming a first sacrificial layer over the insulator. The method further includes forming a flexible layer with in-plane tension and forming a first terminal over the flexible layer. A second sacrificial layer is formed, and a second terminal is formed over the second sacrificial layer. This embodiment further includes forming an upper layer supporting the second terminal and removing the first and second sacrificial layers.

In another switch manufacturing method, A method of manufacturing, an electrode and an insulator are formed on a substrate. A plate is formed in a sacrificial layer over the insulator, and a layer connected to the plate is formed, wherein the layer or the plate, or both comprise one or more terminals. The sacrificial layer is then removed.

In another embodiment, a microelectromechanical systems (MEMS) switch includes a moveable element on a first side of a gap. The moveable element includes a contact conductor and a first electrode. First and second fixed terminals are provided on the first side of the gap. A second electrode on a second side of the gap is configured to move the movable element based on a potential difference applied to the first and second electrodes to selectively connect the first and second terminals. Furthermore, the first and second terminals are connected through the contact conductor when a potential difference less than a threshold is applied between the electrodes.

In another embodiment, a microelectromechanical systems (MEMS) switch includes a substrate, a first electrode deposited on the substrate and a plurality of terminals. A flexible plate is suspended over the electrode and the terminals by an upper support structure, and the flexible plate includes a contact conductor and a second electrode.

DETAILED DESCRIPTION OF CERTAIN EMBODIMENTS

Figure 1:
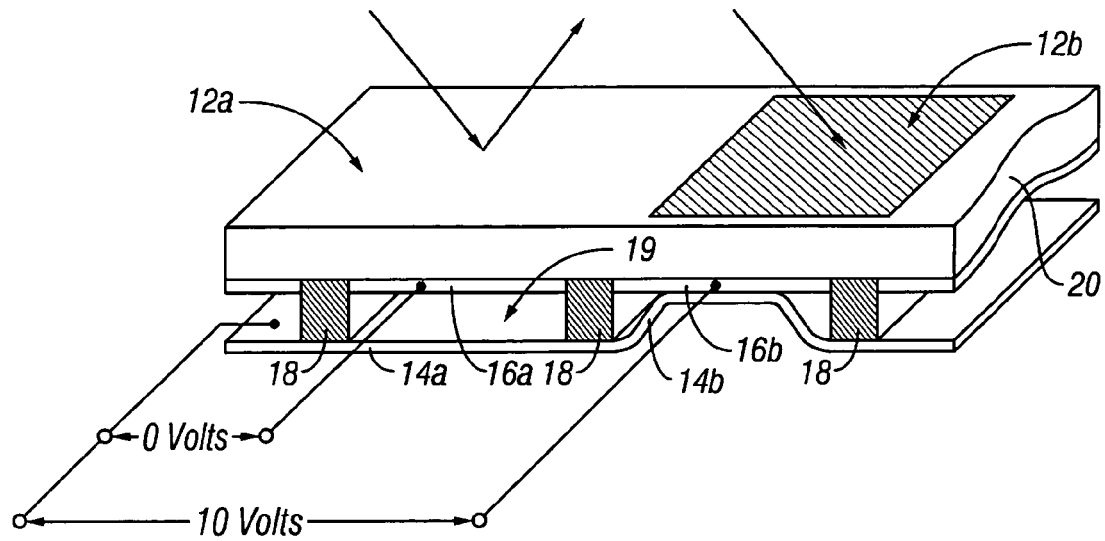
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

The following detailed, description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Several such embodiments are described herein. These switches can be advantageously utilized in many applications due to overlap between switch fabrication steps and display fabrication steps. MEMS switches built from the same basic structure as interferometric modulators ease the integration of logic and switching functions with interferometric modulator arrays. It is possible that other types of switches may be integrated, such as switches fabricated in a manner not similar to the fabrication of the interferometric elements, and more conventional electronic switches fabricated using thin silicon films deposited on the glass substrate. However, because fabrication of interferometric modulator based MEMS switches may be performed using many of the same processing steps that are used in fabricating interferometric modulators, these MEMS switches may be inexpensively integrated onto the same substrate as an array of interferometric modulators used, for example, for a display.

For example, in one embodiment the MEMS switches and interferometric modulators may be fabricated using the same process, although extra steps may be performed on the interferometric modulators and/or the MEMS switches during the manufacturing process. For example, deposition and etching steps to add terminals to the MEMS switches are unnecessary for the fabrication of interferometric modulators. In such an embodiment some common steps would be performed, such as those for forming the electrodes, etc. The MEMS switch terminals would then be formed. After these steps would follow more steps necessary for both the interferometric modulators and the MEMS switches, thus providing a combined interferometric modulator and MEMS switch array. In yet another embodiment, the same process that is used for manufacturing interferometric modulators is used in manufacturing MEMS switches. The interferometric modulators may first be fabricated on a substrate, followed by fabrication of MEMS switches on the substrate. Similarly, MEMS switches may first be fabricated on a substrate, followed by fabrication of interferometric modulators on the substrate. In either case, the manufacturing process does not require significant modification as the MEMS switches comprise many of the same structures as the interferometric modulators.

Some embodiments exhibit the desirable feature that the switch is closed in the mechanically relaxed state. In these embodiments, forces due to applied potentials pull contacts apart to open the switch. This reduces the occurrence of sticking in the closed configuration.

Beginning first with a description of flexing membrane optical modulators, one interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
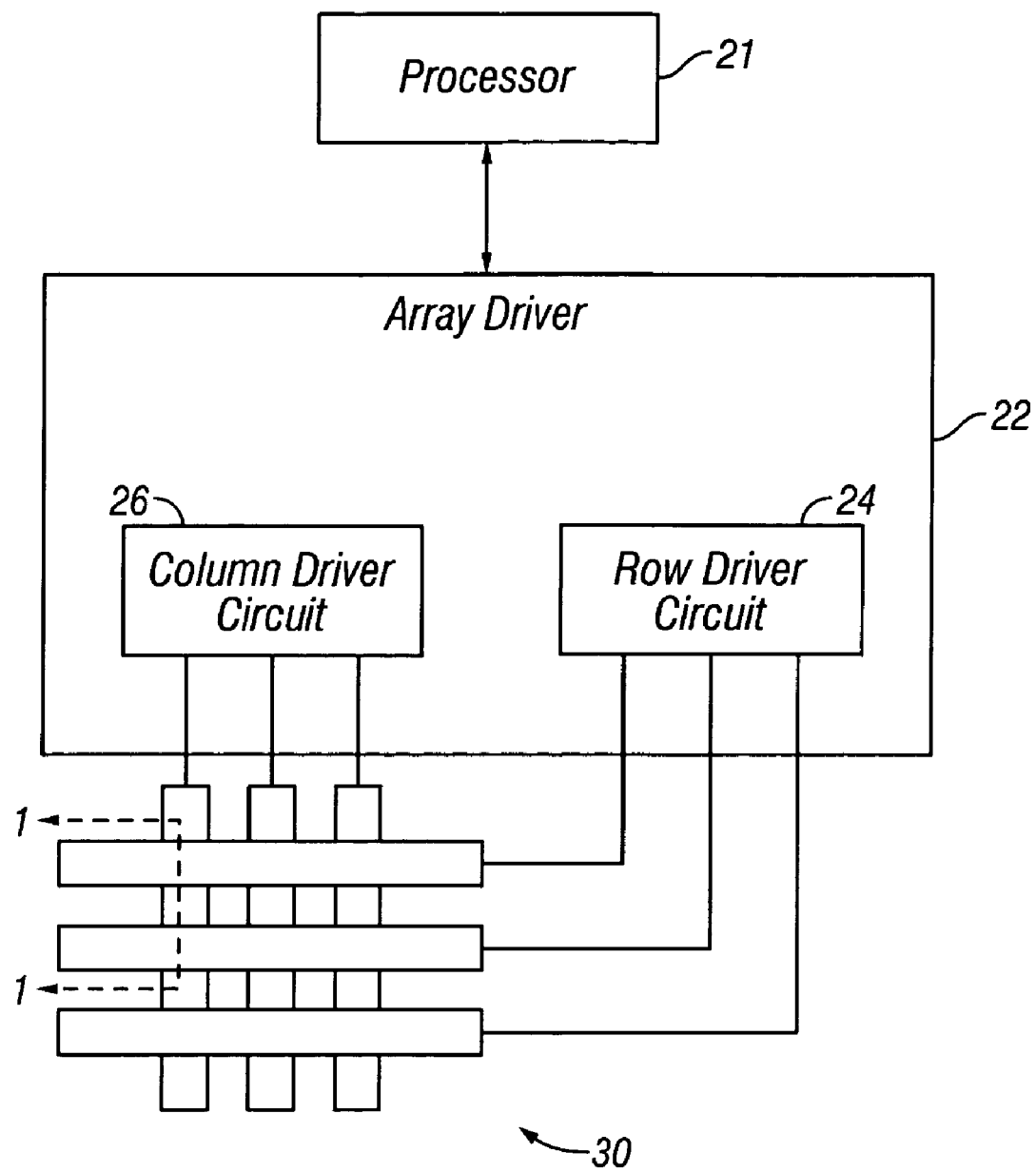
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
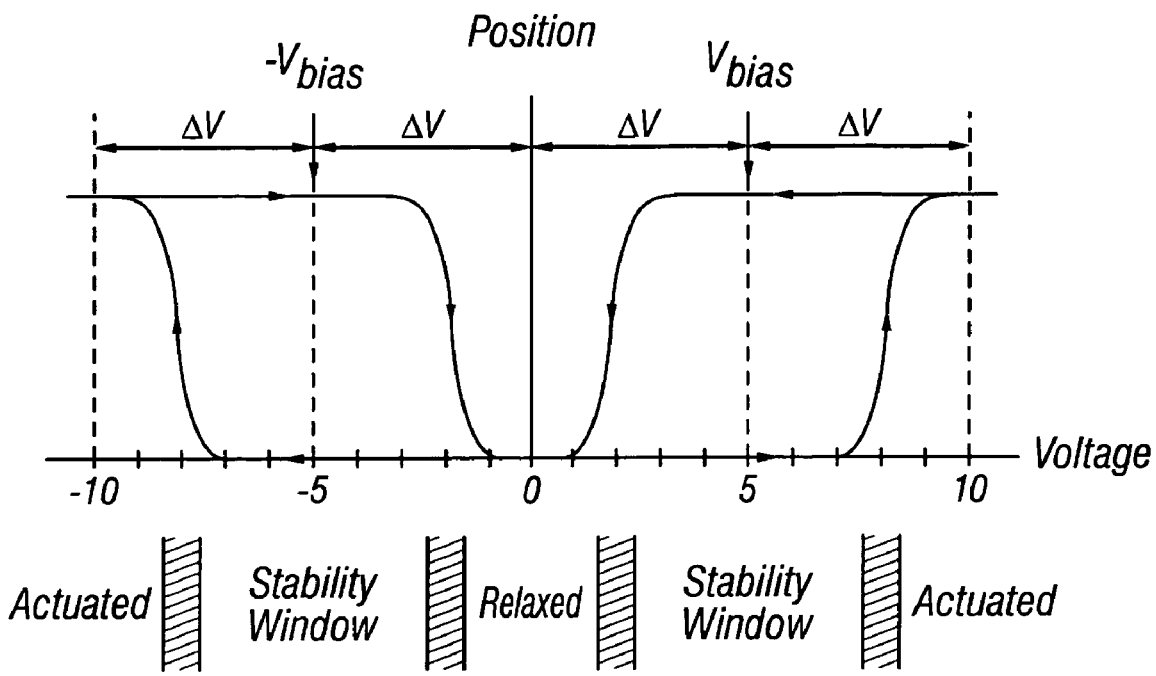
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
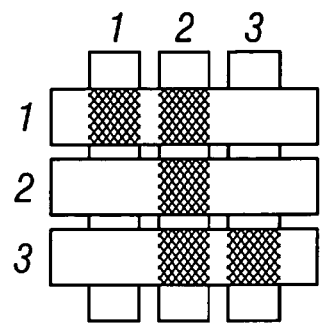
FIGS. 5A and 5B illustrate one exemplary timing diagram for row and column signals that may be used to write a frame of display data to the 3×3 interferometric modulator display of FIG. 2.
Figure 5B:
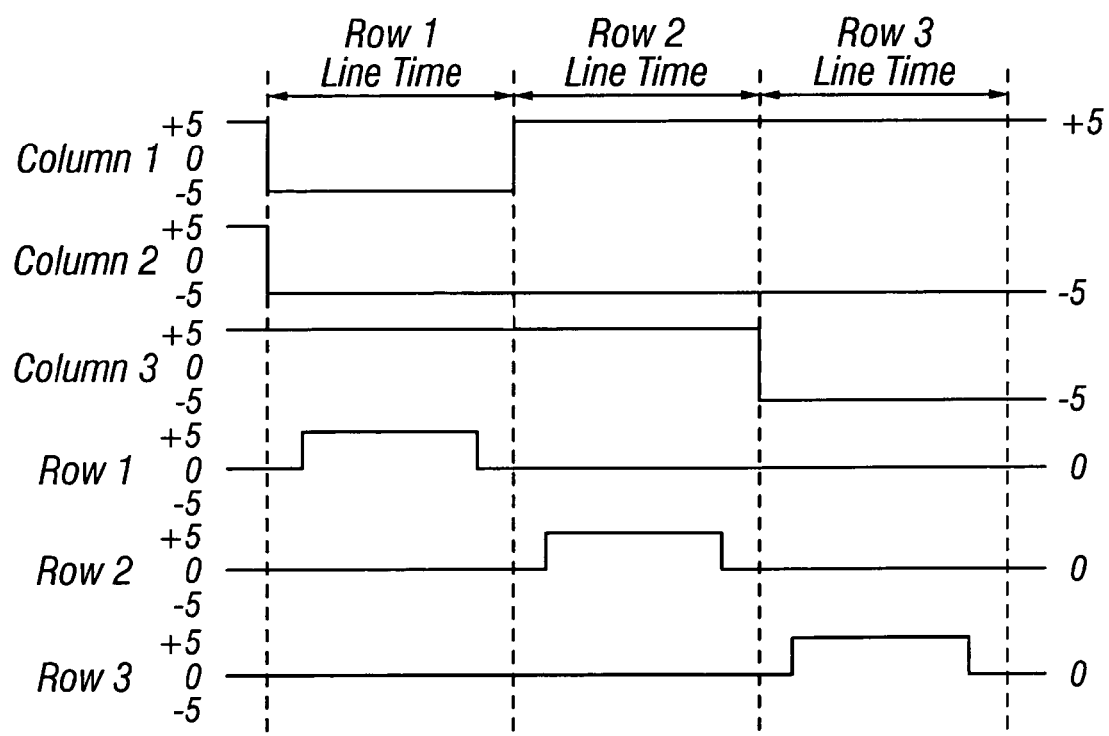

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
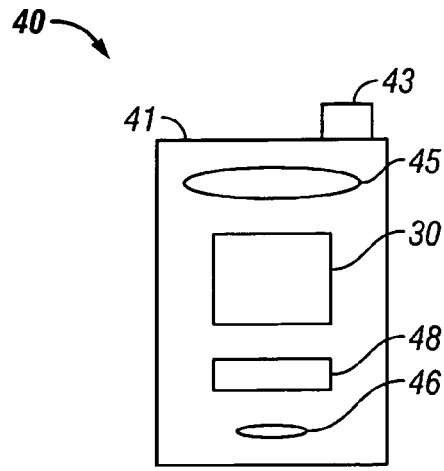
FIGS. 6A and 6B are system block diagrams illustrating an embodiment of a visual display device comprising a plurality of interferometric modulators.
Figure 6B:
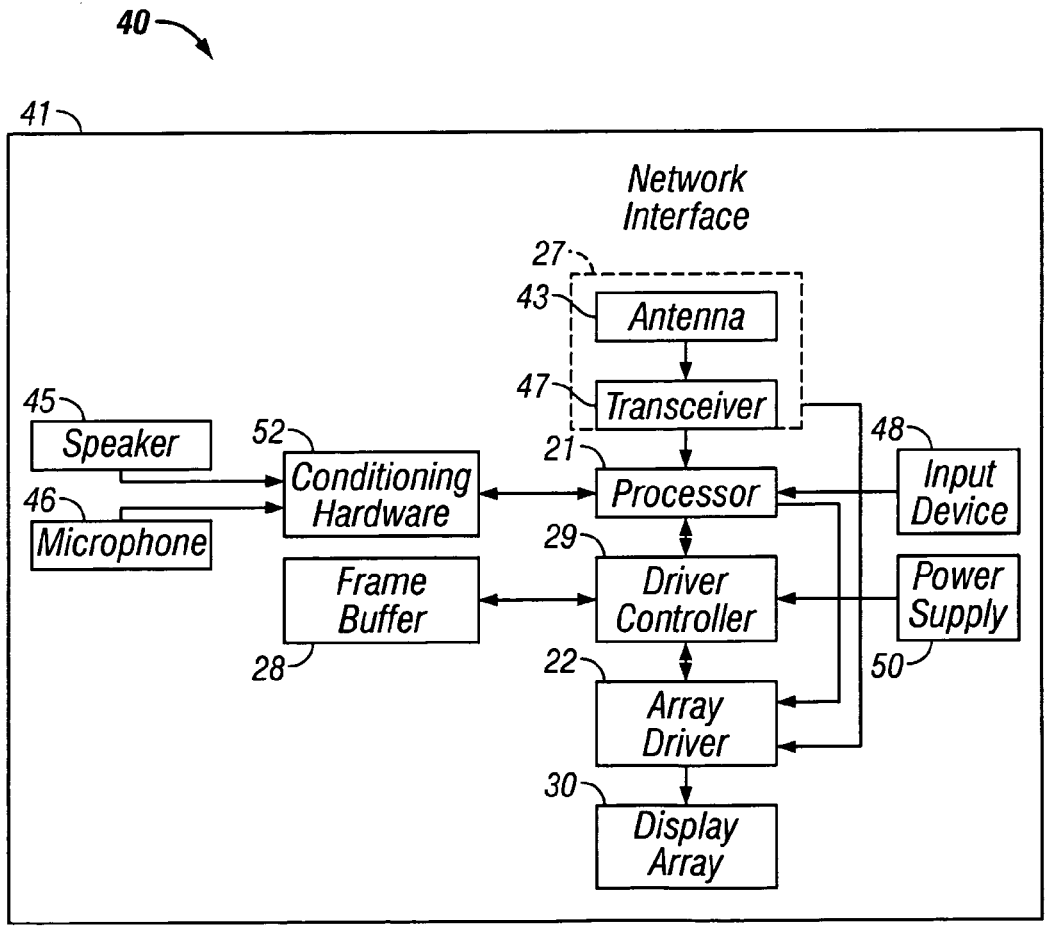

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUE-TOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
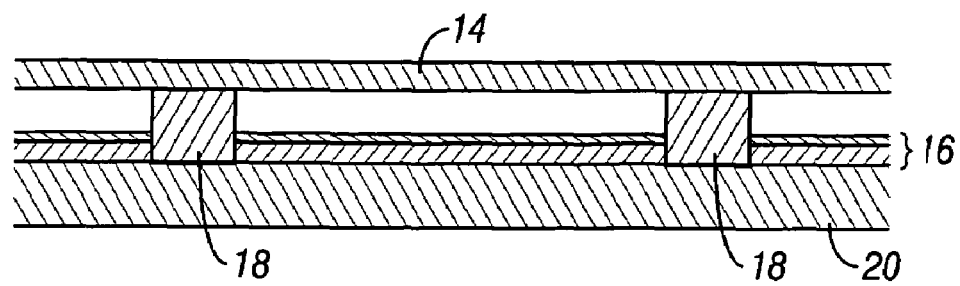
FIG. 7A is a cross section of the device of FIG. 1.
Figure 7B:
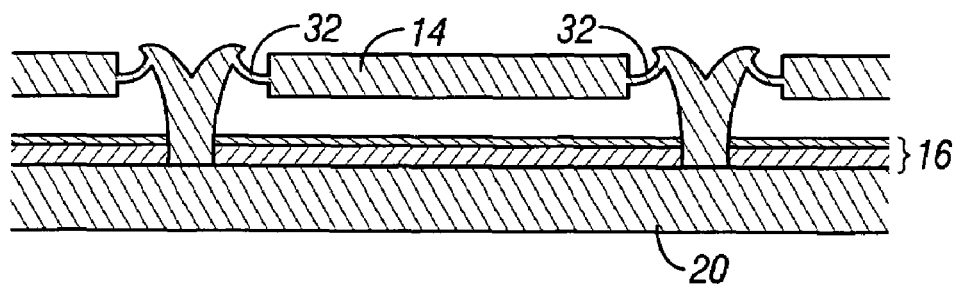
FIG. 7B is a cross section of an alternative embodiment of an interferometric modulator.
Figure 7C:
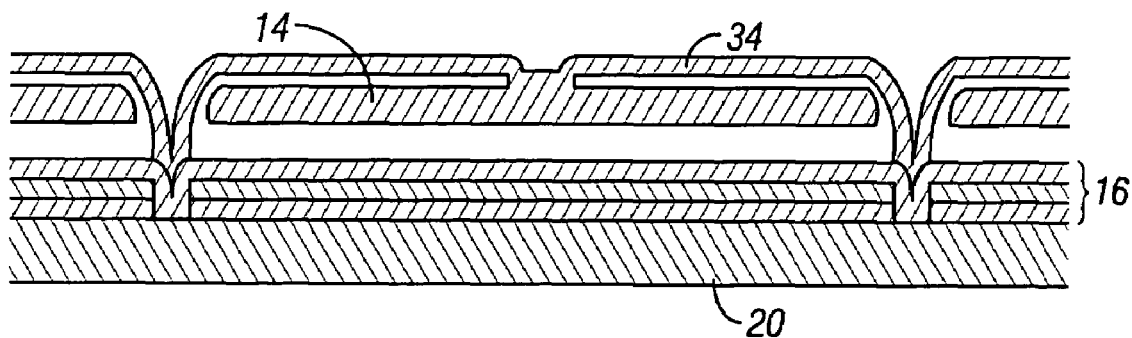
FIG. 7C is a cross section of another alternative embodiment of an interferometric modulator.
Figure 7D:
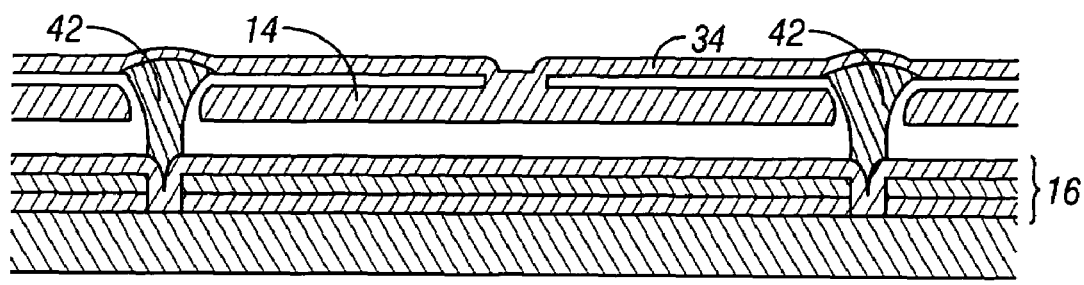
FIG. 7D is a cross section of yet another alternative embodiment of an interferometric modulator.
Figure 7E:
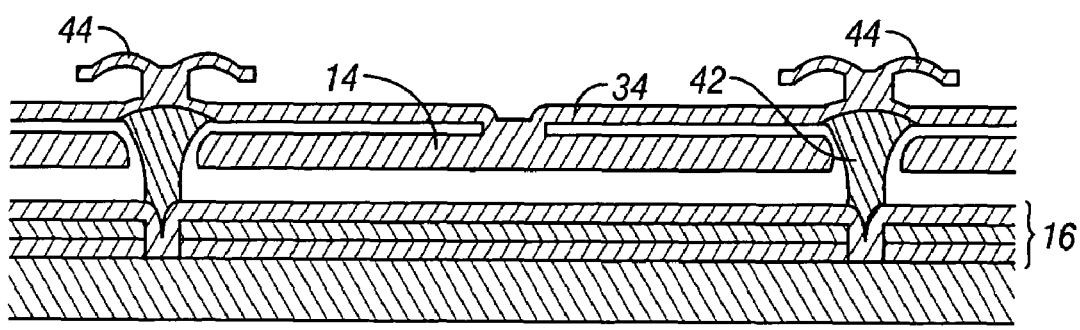
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8A:
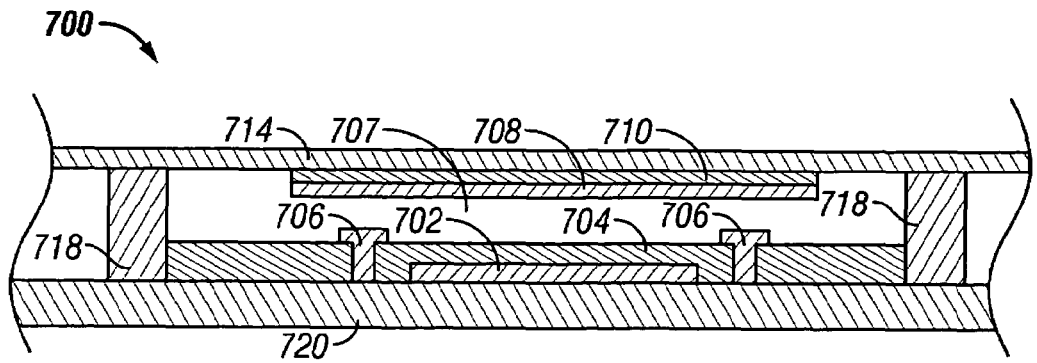
FIG. 8A and 8B show an embodiment of a flexing membrane type MEMS switch

With some modifications the basic structure of an interferometric modulator can be used as a MEMS switch. FIG. 8A is a cross-sectional side view of a MEMS switch 700. The MEMS switch 700 of FIG. 8A has similar collapsible cavity features as the interferometric modulator of FIG. 7A. The MEMS switch 700 additionally includes two terminals 706, an insulating layer 710, and a conductive strip 708. As used herein, the term "terminal" of a switch is used to indicate a conductive element that provides a signal input or output to or from the switch. The switch itself provides selective electrical connections between its terminals. As will be seen from the description of the switch embodiments below, a switch may include a conductive element that is not itself a signal input or output point, but that selectively bridges different terminals to provide the switch function. These conductive elements are referred to as contact conductors herein.

Thus, the MEMS switch 700 is a structure that provides selective electrical contact between the two terminals 706. More particularly, the MEMS switch 700 is closed when the terminals 706 are in electrical contact and the MEMS switch is open when the terminals 706 are not in electrical contact. In a mechanically relaxed state, terminals 706 are not in electrical contact and, thus, the MEMS switch 700 is open. As shown in FIG. 8A, the MEMS switch 700 comprises a moveable material 714, a conductive strip 708, and an insulating layer 710 between the moveable material 714 and the conductive strip 708. A substrate 720 supports an electrode 702, and an insulating layer 704 on the electrode 702. Two terminals 706, separated by a distance, are deposited on and/or through the insulating layer 704. The terminals 706 may connect to other circuitry using vias through insulating layer 704 and/or electrode 702. Insulating layer 704 and moveable material 714 are mechanically separated by supports 718 in order to define a cavity 707. As described above with respect to interferometric modulators, the moveable material 714 is deformable, such that the moveable material 714 may be deformed towards the substrate 720 when a voltage difference is applied across the moveable material 714 and the electrode 702. This is analogous to the reflective material 14, substrate 20, and electrode 16 of FIG. 7A, and to the reflective layers 14a and 14b, the transparent substrate 20, and the reflective layers 16a and 16b of FIG. 1. The moveable material 714 may have on it an insulator 710, which has upon it the conductive strip 708. The conductive strip 708 is aligned so that when the moveable material 714 is deflected towards the substrate 720 by an applied potential as described above, the conductive strip 708 contacts both of the terminals 706, causing the terminals 706 to be in electrical contact and the MEMS switch 700 to be closed. The conductive strip thus acts as a contact conductor through which the terminals are electrically connected. In this embodiment, the conductive strip 708 is electrically isolated from the moveable material 714 by insulator 710 so that contact between the terminals 706 and the movable material 714 does not disturb the voltage difference applied across the moveable material 714 and the electrode 702. In some embodiments, where such isolation is not necessary, the conductive strip 708 and the insulator 710 will not be needed, and the moveable material itself 714 can function as the contact conductor that bridges the two terminals 706. When the voltage applied across the moveable material 714 and the electrode 702 is reduced below a certain level (as is also described above), the moveable material 714 returns to its mechanically relaxed state and the MEMS switch 700 is opened.

Figure 8B:
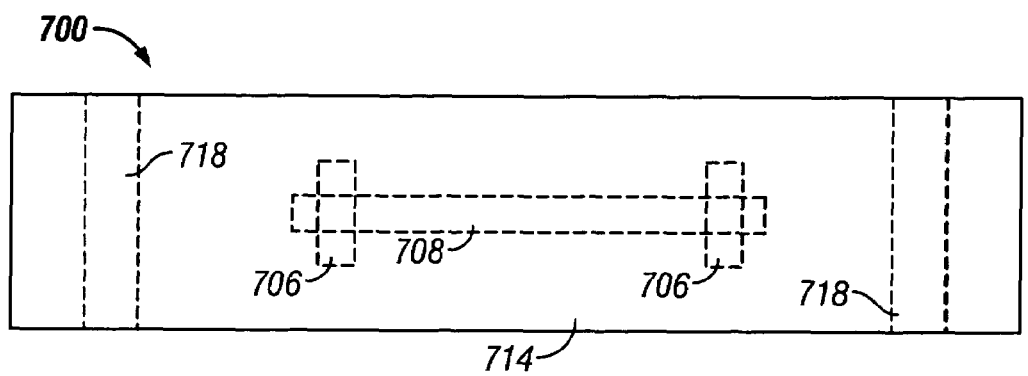

FIG. 8B is a top view of MEMS switch 700. The supports 718, the conductive strip 708, and the terminals 706 are shown as seen looking through the moveable material 714. Conductive strip 708 may be significantly smaller than the moveable material 714. This is to ensure that the electromotive force between the moveable material 714 and the electrode 702 is larger than the electromotive force between the conductive strip 708 and the electrode 702 because once the strip contacts the electrodes, the potential on the strip may differ from the potential on the moveable material.

It is possible to fabricate a double cavity switch embodiment wherein the moveable layer can deflect downward to a first pair of contacts and also upward to another pair of contacts. In these embodiments, a second insulator, similar to insulator 710, may be formed over the moveable material 714 and a second conductive strip, similar to conductive strip 708 formed over the second insulator. A second cavity, similar to cavity 707 would exist between the second conductive strip and a second insulating layer, similar to insulating layer 704. The second insulating layer would be supported by structures similar to supports 718 and would also have a second electrode, similar to electrode 702 and a second set of terminals similar to terminals 706. The structure over the moveable material 714 could have operation similar to that of the structure below the moveable layer discussed above. The moveable material 714 is configured to be moveable in the direction towards the second electrode when a sufficient potential difference is applied across the moveable material 714 and the second electrode. When this occurs the second conductive strip can make contact with the second set of terminals. With appropriate voltages on the moveable material 714, the electrode 702 and the second electrode this switch can be operated to electrically connect the terminals 706, the second set of terminals, or neither so as to form a tri-state switch. In some embodiments the structures over the moveable material may be similar in structure and in functionality. In other embodiments the structures over the moveable material may be similar only in functionality.

Figure 9:
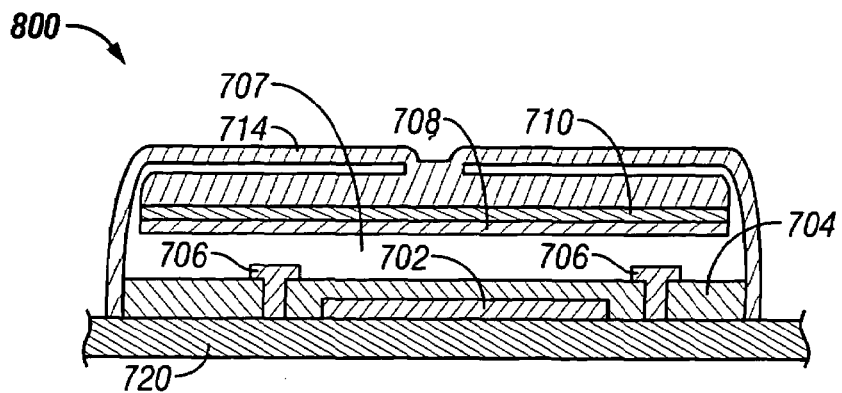
FIG. 9 shows another embodiment of a flexing membrane type MEMS switch.

FIG. 9 is a cross-sectional side view of a MEMS switch 800 of another embodiment. MEMS switch 800 has similar constructional features as the interferometric modulator of FIG. 7C. It also has MEMS switch functionality and features similar to those of MEMS switch 700 in FIG. 8A. Such features are labeled with like reference numerals as those used with reference to FIG. 8A.

Figure 10A:
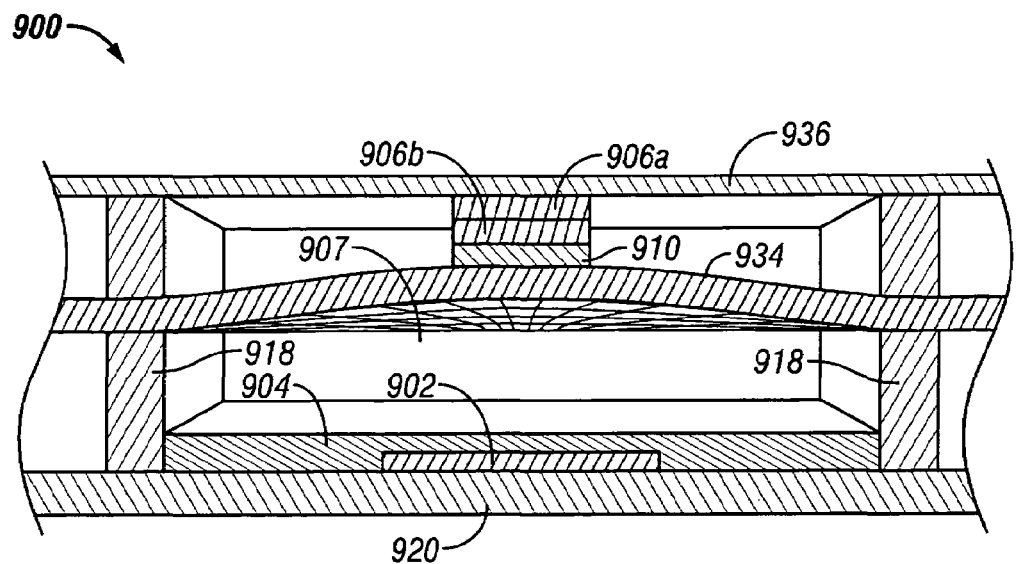
FIGS. 10A and 10B are side cross-sectional views of a MEMS switch that opens contacts upon application of a potential difference.
Figure 10B:
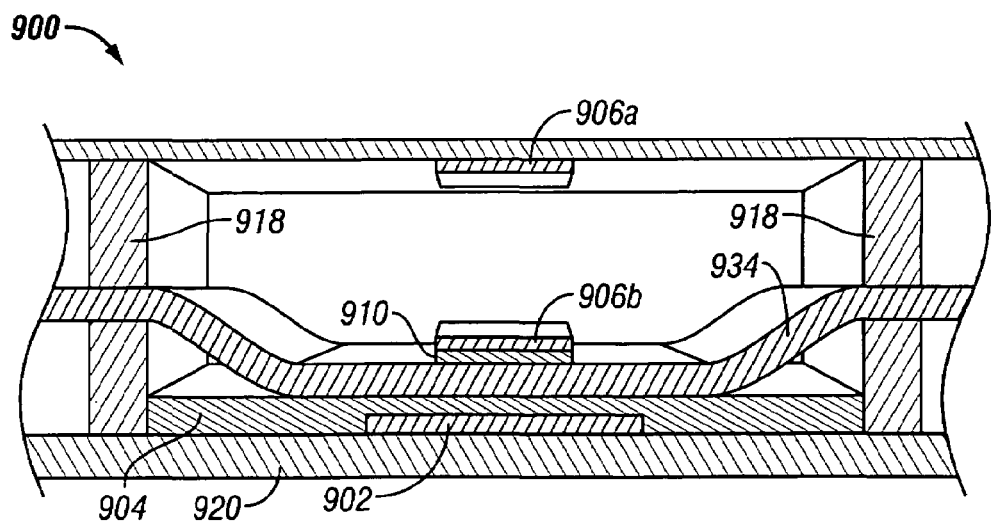

In some embodiments, a MEMS switch may have features as illustrated in FIGS. 10A and 10B, which show a cross-sectional side, three-dimensional view of a MEMS switch 900. The MEMS switch 900 of FIGS. 10A and 10B have similar collapsible cavity features as the interferometric modulator of FIG. 7A. MEMS switch 900 has a structure that provides selective electrical contact between the two terminals 906A and 906B. More particularly, the MEMS switch 900 is closed when the terminals 906A and 906B are in electrical contact (FIG. 10A) and the MEMS switch is open when the terminals 906A and 906B are not in electrical contact (FIG. 10B). The MEMS switch 900 comprises a deformable layer 934, two terminals 906A and 906B, an insulating layer 910 between the deformable layer 934 and the terminal 906B, a substrate 920 supporting an electrode 902, and an insulating layer 904 on the electrode 902. Insulating layer 904 and deformable layer 934 are separated by supports 918 in order to define a cavity 907. The height of supports 918 is variable and in some embodiments the supports 918 are not needed. In a mechanically relaxed state (FIG. 10A), terminals 906A and 906B are in electrical contact and, thus, the MEMS switch 900 is closed. When a large enough voltage difference is applied across the deformable layer 934 and the electrode 902 the deformable layer 934 deflects towards the substrate 920, as shown in FIG. 10B. This is analogous to the movement of the reflective material 14, relative to the substrate 20, and electrode 16 of FIG. 7A; and of the reflective layers 14a and 14b, to the transparent substrate 20, and the reflective layers 16a and 16b of FIG. 1. When the deformable layer 934 is deflected towards the substrate 920, the terminal 906B does not contact the terminal 906A, causing the MEMS switch 900 to be open. Similarly, when the voltage applied across the deformable layer 934 and the electrode 902 is reduced below a certain level, the deformable layer 934 returns to its mechanically relaxed state, the terminal 906B contacts the terminal 906A and the MEMS switch 900 is again closed.

The relative positions, shape, and flexible/rigid material character of the terminals, contact conductors (if present), and electrodes maintain the switch closed in the mechanically relaxed state, and open in the voltage activated state. As will be appreciated by those of skill in the art, leads and traces for the conductive elements shown in FIGS. 10A and 10B may be over the top layer 936. In some embodiments routing may also be below the electrode 902. In other embodiments there may be routing within or near the supports 918. In some embodiments routing may be within the structure shown, e.g. in the gap between the layer 934 and the substrate 920. Conductive traces into and out of the switch may be within, above or below the insulating layer 904, the deformable layer 934, and/or the top layer 936. In some embodiments a 1- or 2-dimensional array of switches is formed. The array may be configured such that terminals 906A and/or 906B are connected and shared amongst a plurality of adjacent or non-adjacent switches. Terminals 906A and/or 906B may be configured to be bus lines running into and out of the plane of FIGS. 10A and 10B. The deformable layer 934, and/or the top layer 936 may be shared amongst a plurality of adjacent or non-adjacent switches. The deformable layer 934, and/or the top layer 936 may be configured to be bus lines running left and right within the plane of FIGS. 10A and 10B.

A significant difference between the embodiment of FIGS. 10A and 10B and many other MEMS switches is that when a voltage is applied across the deformable layer 934 and the electrode 902 the MEMS switch goes to an open state. We call this an assert open type of switch. Other types of MEMS switches go to a closed state when a voltage is applied across the moveable material. We call this an assert closed type of switch. A benefit of an assert open switch over an assert closed switch has to do with the tendency of MEMS switches to stick in a closed position. When closed for extended periods of time, especially with current flowing through them, a mechanical bond tends to develop between the metal of the terminals and the metal contacting the terminals. If the mechanical bond becomes stronger than the force working to open the MEMS switch, it will be stuck in the closed position. In an assert open switch the electromotive force works to open the switch by pulling the deformable layer 934 toward the electrode 902. With realistic voltages the electromotive force working against a mechanical bond is easily made great enough to break such contact bonds. The electromotive force working to open an assert open switch is typically stronger than the mechanical force working to open an assert closed switch. Thus, the assert open switch is less susceptible to sticking than the assert closed switch.

To produce the switch illustrated in FIGS. 10A and 10B, it is advantageous that the deformable layer 934 buckles upward when in a mechanically relaxed state. This can be accomplished by depositing the deformable layer 934 such that it is under in-plane tension. The deformable layer 934 may be patterned into a rectangular geometry such that it is fixed to supports 918 at a first pair of opposite edges, and free at the other pair of opposite edges. The in-plane tension is therefore higher across the support 918 edges than across the free edges, causing an out-of-plane hump. The direction of the hump is determined by a gradient in the tension through the thickness of the deformable layer 934. If there is higher tension on the substrate 920 side of the deformable layer 934 than on the terminal 906A side it will buckle towards the terminal 906A. The tension gradient may be realized in a single layer or as composite layers. Placing perforations or cuts in the terminal 906A side of the deformable layer 934 will amplify the buckling response. Altering the compliance of the supports 918 will also affect the buckling response. Geometries other than rectangular, such as hexagonal or triangular, and other support placement configurations may also be used to manipulate the resulting membrane contours.

In the manufacturing process for a MEMS switch as shown in FIGS. 10A and 10B, the insulator 904 may be formed on the substrate 920 around the electrode 902. The supports 918 may then be formed on the substrate 920. A first sacrificial layer may then be formed over the insulator and between the supports 918. The deformable layer 934 with in-plane tension may then be formed on supports 918 and the first sacrificial layer. The dielectric 910 the terminal 906B, and a second sacrificial layer, may then be formed over the deformable layer 934. Following this, terminal 906A and top layer 936 may be formed. Finally, the sacrificial layers may be removed. Other methods and steps may be used, as well.

Figure 11A:
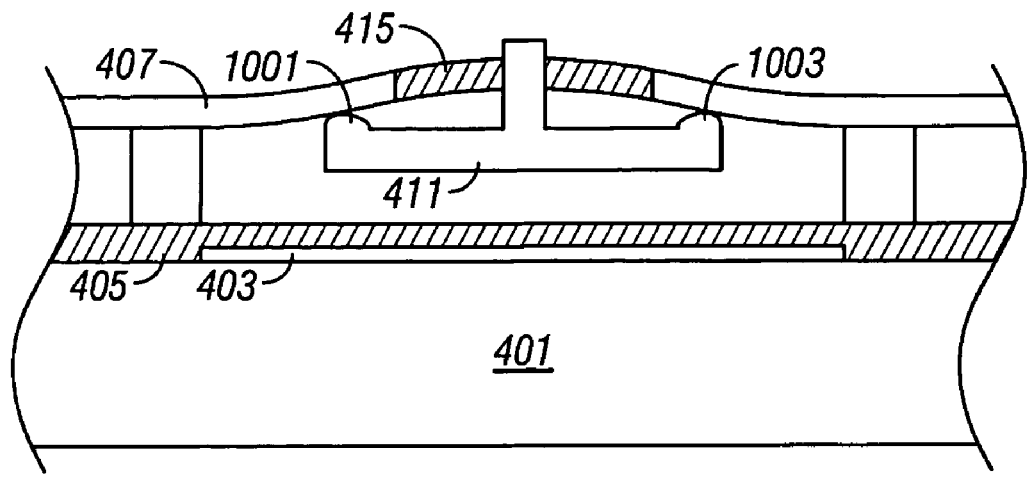
FIGS. 11A and 11B are side cross-sectional views of another embodiment of a MEMS switch that opens contacts upon application of a potential difference.
Figure 11B:
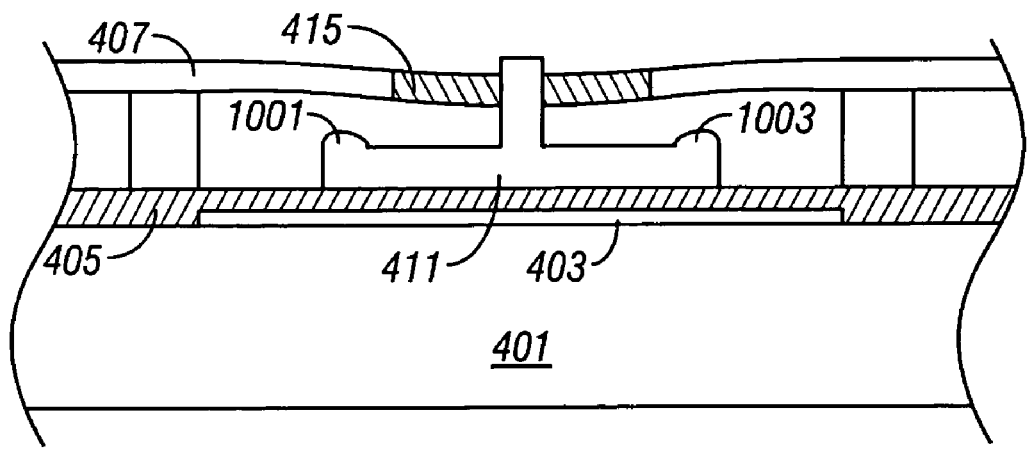

Another embodiment of an assert open MEMS switch is shown in FIGS. 11A and 11B. The mechanical operation of this switch is analogous to those previously presented. The electrostatic force induced by an applied voltage works to pull a relatively rigid conductive plate 411 toward the electrode 403 while the mechanical restorative force induced by the deformation of the upper flexible support layer 407 tends to pull the conductive layer 411 away from the electrode 403. Protrusions 1001 and 1003 are on the upper side of conductive layer 411. The shape, location and/or number of the protrusions may vary in different embodiments. In an unasserted state, as shown in FIG. 11A, the upper layer 407 is electrically connected to the conductive plate 411 by the protrusions 1001 and 1003. In this embodiment, the flexible layer 407 and the plate 411 each form terminals of the switch, and the plate 411 also functions as an electrode wherein an electric field between the plate 411 and the other electrode 403 on the substrate causes the terminals 411, 407 to disconnect by pulling the plate 411 downward. In an asserted state, as shown in FIG. 11B, the upper layer 407 is electrically isolated from the conductive layer 411 by the dielectric 415 and a gap between the protrusions and the layer 407 created by pulling the conductive layer 411 toward the electrode 403. Thus, when the MEMS device 1000 is operated, the conductive layer 411 is selectively connected to and disconnected from the upper layer 407. In some embodiments, the buckling of upper layer 407 in the relaxed state is less than that shown in FIG. 11A. In some embodiments, the upper layer 407 is not buckled in the relaxed state but starts essentially flat. In these embodiment, downward motion can still pull the protrusions off the terminals to open the switch.

In the manufacturing process for a MEMS switch as shown in FIGS. 11A and 11B, the insulator 405 may be formed on the substrate 401 around the electrode 403. The supports may be formed on the substrate and a sacrificial layer may be formed between the supports and over the insulator. Material forming the plate 411 may then be deposited and etched, with additional sacrificial material formed over it. The flexible layer 407 may then be deposited. The sacrificial layer may then be removed.

Figure 12:
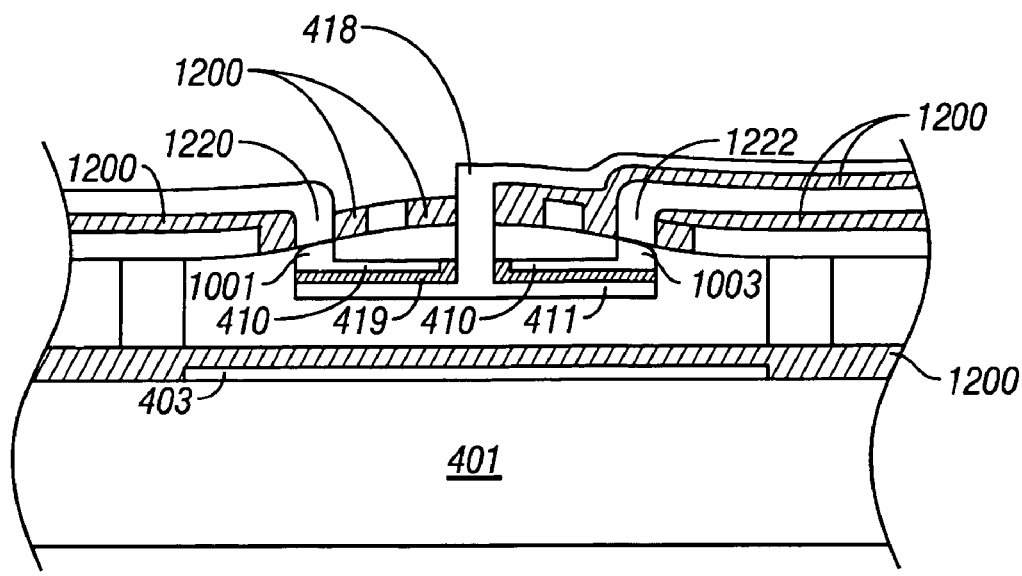
FIG. 12 is a side cross-sectional view of another embodiment of a MEMS switch that opens contacts upon application of a potential difference.

In the embodiment illustrated in FIG. 12, the protrusions 1001 and 1003 are connected to a common strip of conductive material 410 functioning as a contact conductor like the strip shown in FIGS. 8A and 8B which is electrically isolated from conductive layer 411 forming an electrode and extension 418. Conductive layer 411 and extension 418 may be connected by one or more vias through the contact conductor 410 and insulator 419, or alternatively, the contact conductor 410 and insulator 419 may be routed around the central post formed by the extension 418. Terminals 1220, 1222 extend through the flexing membrane 407 and are aligned with the protrusions 1001, 1003. The position of the conductive layer 411 is controlled by applying a voltage difference between the conductive layer 411 and the electrode 403. In this embodiment when in an unasserted state as shown in FIG. 12, the contact conductor 410 is electrically connected to one contact 1220 by the protrusion 1001 and electrically connected to the other contact 1222 by the protrusion 1003. In an asserted state, with a sufficient potential difference applied between the plate 411 and the electrode 413, the contact conductor 410 is pulled down and away from contacts 1220 and 1222. Thus, when the MEMS device is operated, the contacts 1220 and 1222 are selectively connectable through contact conductor 410. As with the device illustrated in FIG. 11, the contacts 1220 and 1222 are opened with the electric field induced forces, and are connected in the mechanically relaxed state. The conductive elements of the embodiment shown in FIG. 12 are electrically isolated from one another by the dielectric material 1200.

Figure 13:
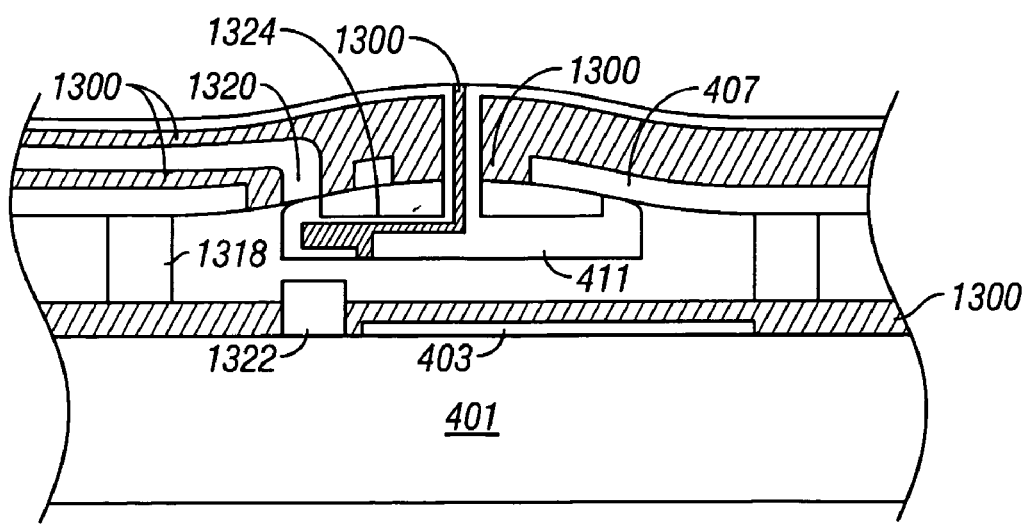
FIG. 13 is a side cross-sectional view illustrating a MEMS device operable as a tri-state switch.

In the embodiment illustrated in FIG. 13, the MEMS device may be operated as a double pole single throw switch. In this embodiment, a first terminal 1320 is attached to the upper flexible layer 407, and a second terminal 1322 is deposited on the substrate 401. A third terminal 1324 is configured to make electrical contact with the first terminal 1320 in the mechanically relaxed state, and configured to make contact with the second terminal 1322 in the fully actuated state. This arrangement provides a double-pole single throw switch configuration. In such an embodiment, if the voltages applied to the plate 411, the electrode 403, and the deformable layer 407 are controlled appropriately, the plate 411 can be made to be suspended between the first contact 1320 and the second contact 1322. This forms a tri-state switch. In some embodiments the electrode 403 may comprise the second contact 1322. The conductive elements of the embodiment shown in FIG. 13 are electrically isolated from one another by the dielectric material 1300. Various routing configurations may be employed to electrically connect the elements of the embodiment of FIG. 13 as well as other embodiments. For example there may be routing below and/or beside the electrode 403. There may be conductive routing within, adjacent to, or nearby the support posts 1318. There may also be routing above the layers shown.

Figure 14A:
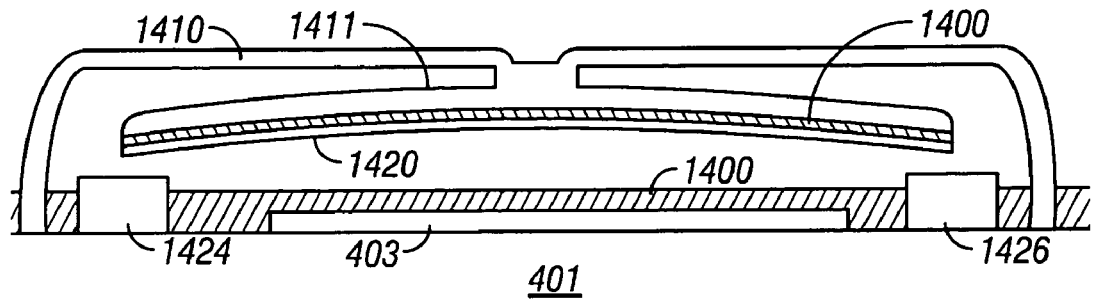
FIGS. 14A and 14B illustrate another embodiment of a flexing membrane type MEMS switch.
Figure 14B:
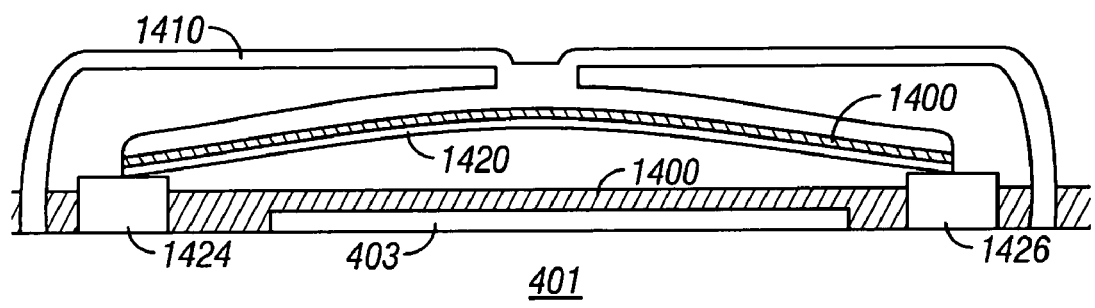

FIGS. 14A and 14B show an embodiment of a MEMS switch with different structure than those illustrated above. In this embodiment, the upper support structure 1410 that covers the gap of the device is not deformable, but is relatively rigid due either to the materials it is fabricated from, its thickness, etc. The conductive plate 1411 however, is relatively flexible. As used herein, the term "rigid" when applied to a portion of these switches means substantially unaffected by the voltages applied to the electrodes in normal use. The term "flexible" when applied to a portion of these switches means that its shape or configuration is significantly affected by the voltages applied to the electrodes in normal use. In this embodiment, when a potential is applied between the plate 1411 and the electrode 403, the edges of the plate 1411 are deformed downward until the contact conductor 1420 contacts the terminals 1424 and 1426 as illustrated in FIG. 14B. The conductive elements shown in FIGS. 14A and 14B are electrically isolated from one another by the dielectric material 1400. In some embodiments, the plate 1411 and the contact conductor 1420 are not electrically isolated, and may be formed as a single metal plate.

Figure 15A:
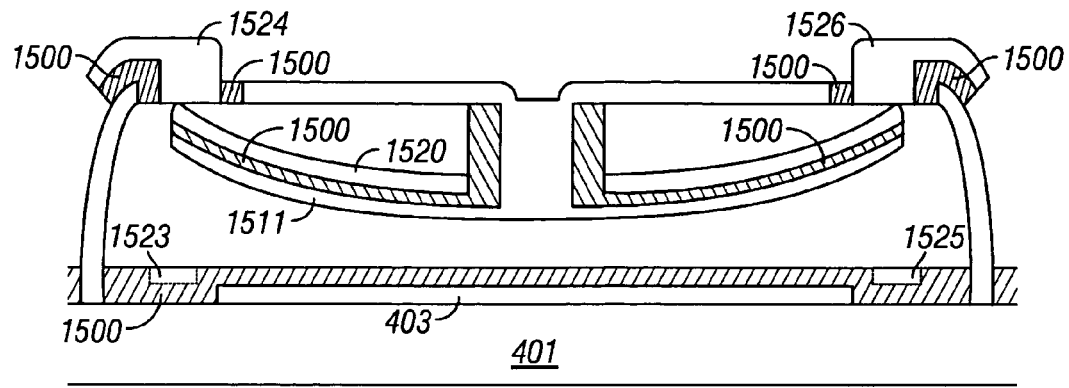
FIGS. 15A and 15B illustrate another embodiment of a flexing membrane type MEMS switch that opens contacts upon application of a potential difference.
Figure 15B:
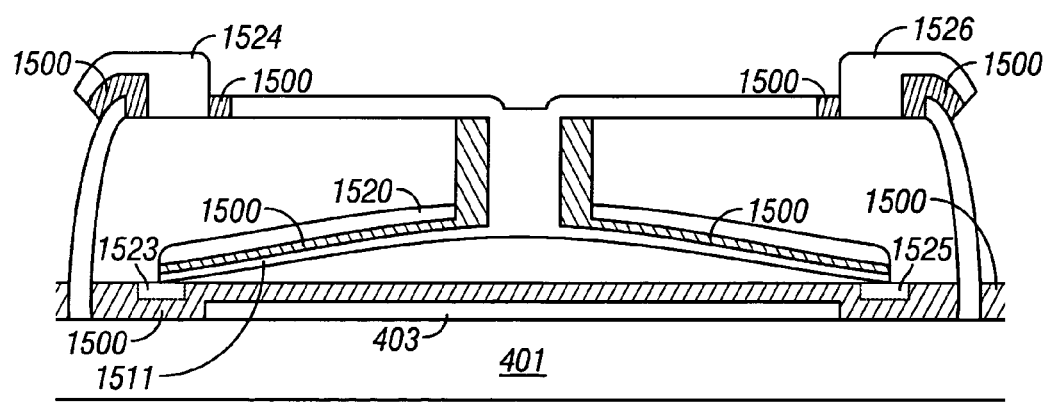

FIGS. 15A and 15B illustrate an assert open switch of this type. The plate 1511 is manufactured with in plane tension so that it is curved upward in the mechanically relaxed state after the sacrificial material is removed to form the central gap. In some embodiments the plate 1511 is substantially planar in the relaxed state, and may include protrusions as described above. When in the relaxed state, a contact conductor 1520 makes contact with terminals 1524 and 1526. Note that the conductive path between the terminals 1524 and 1526 through contact conductor 1520 is not shown in its entirety, because a portion of the conductive path is out of the plane of this cross-sectional view (as in FIG. 12 as well). When a potential is applied between plate 1511 and electrode 403, the edges of the plate 1511 are pulled downward, breaking the contact between the contact conductor 1520 and the terminals 1524 and 1526. In some embodiments additional terminals 1523 and 1525 may be included. In these embodiments, the terminals 1523, 1525 may be contacted and bridged by the plate 1511. If a contact conductor that is isolated from the plate 1511 is desired, a second contact conductor (not shown) may be provided on the bottom of the plate 1511 that is insulated from the plate 1511 itself and that makes contact with the terminals 1523 and 1525. The conductive elements shown in FIGS. 15A and 15B are electrically isolated from one another by the dielectric material 1500.

In some embodiments, combinations of assert open and assert closed MEMS switches can be used to create digital logic functions, such as AND, NAND, NOR, OR, XOR, XNOR, and AOI. Other digital logic functions and combinations are also possible.

Logic blocks comprising assert open or combinations of assert open and assert closed MEMS switches may be arranged together to provide logical functions typically found in external components, thereby saving system cost. For example, MEMS switches may be arranged for use in the capacity of low leakage transistors, shift registers, or decoders. In the context of an interferometric modulator display, MEMS switches may be used in conjunction with row drivers or column drivers, for example. Advantageously, MEMS switches may be manufactured on various substrates, such as glass substrates, silicon or plastic substrates, for example. Placing switches on large area glass substrates is generally less expensive than silicon substrates, providing an advantage over many forms of conventional transistor based logic.

While the above detailed description has shown, described, and pointed out novel features as applied to various embodiments, it will be understood that various omissions, substitutions, and changes in the form and details of the device or process illustrated may be made by those skilled in the art without departing from the spirit of the invention. For example, various embodiments could have 3, 4, or a variety of numbers of terminals. Although many embodiments shown above include electrically separate contact conductors, terminals, and electrodes, any of these items could be combined into single elements or parts where the potentials applied during normal operation to those elements are consistent. In some embodiments certain portions of the plate are independently controllable from other portions of the plate. Some embodiments have two or more plates. Various other embodiments use alternative configurations and combinations of those elements previously discussed.

As will be recognized, the present invention may be embodied within a form that does not provide all of the features and benefits set forth herein, as some features may be used or practiced separately from others, and features of one embodiment may be combined with features of other embodiments.

The invention claimed is:

1. A microelectromechanical systems (MEMS) switch comprising:
   at least first and second terminals;
   a first electrode; and
   a deformable element having at least a portion thereof forming a second electrode and being moveable between a relaxed state and an actuated state in response to applied electric potentials between the second electrode and the first electrode, wherein the first terminal and the second terminal are selectively connectable depending on the position of said deformable element, and wherein the first terminal and the second terminal are electrically connected when the deformable element is in the relaxed state.

2. The MEMS switch of claim 1, wherein at least one of said terminals moves with said deformable element.

3. The MEMS switch of claim 1, wherein said deformable element is supported over a substrate, and said first electrode is deposited on said substrate.

4. The MEMS switch of claim 3, wherein said first electrode is covered with an insulating material.

5. The MEMS switch of claim 1, wherein said deformable element is supported over a substrate, and at least one terminal is deposited on said substrate.

6. The MEMS switch of claim 5, wherein said first electrode is deposited on said substrate.

7. The MEMS switch of claim 1, wherein said deformable element comprises a flexible material that is curved in a mechanically relaxed state.

8. The MEMS switch of claim 1, wherein the deformable element comprises a flexible material supporting a rigid plate.

9. The MEMS switch of claim 8, wherein said flexible material comprises the first terminal and the rigid plate comprises the second terminal.

10. The MEMS switch of claim 9, wherein said rigid plate comprises one or more portions extending toward said flexible material and that make contact with one or more terminals in a mechanically relaxed state.

11. The MEMS switch of claim 10, wherein said one or more rigid plate portions directly contacts said flexible material.

12. The MEMS switch of claim 10, wherein said one or more rigid plate portions contact one or more terminals attached to said flexible material.

13. The MEMS switch of claim 8, wherein said rigid plate comprises a contact conductor configured to electrically connect a pair of terminals attached to said flexible material.

14. The MEMS switch of claim 8, wherein said deformable element is supported over a substrate, at least a third terminal is deposited on said substrate, at least the first terminal is attached to said flexible layer, and wherein said rigid plate comprises the second terminal configured to contact said first terminal or said third terminal, or neither terminal, depending on the position of the deformable element.

15. The MEMS switch of claim 1, wherein said deformable element comprises a flexible plate supported from a rigid upper support structure.

16. The MEMS switch of claim 15, wherein at least a portion of the flexible plate comprises the second electrode.

17. The MEMS switch of claim 15, wherein said flexible plate comprises a contact conductor configured to contact terminals attached to said rigid upper support structure.

18. The MEMS switch of claim 17, wherein said flexible plate is supported above a substrate by said upper support structure, wherein a pair of terminals are deposited on said substrate, and wherein said flexible plate comprises a second contact conductor configured to electrically connect said pair of terminals deposited on said substrate.

19. The MEMS switch of claim 1, wherein said deformable element comprises a flexible material supported over a substrate, at least the first terminal is attached to said flexible material on a side opposite to said substrate, and wherein the second terminal is supported in a fixed location adjacent to said first terminal.

20. A method of opening a microelectromechanical systems (MEMS) switch comprising moving a deformable membrane between a relaxed state and an actuated state, thereby disconnecting a first switch terminal from an established electrical coupling to a second switch terminal when the membrane moves to the actuated state in response to an electric field.

21. The method of claim 20, wherein said first switch terminal is attached to the deformable membrane.

22. The method of claim 21, wherein said second switch terminal is fixed relative to said deformable membrane.

23. The method of claim 21, wherein said second switch terminal is also attached to said deformable membrane.

24. The method of claim 20, wherein said first switch terminal and said second switch terminal are fixed, wherein said electric field deforms a flexible plate, and wherein said flexible plate comprises a contact conductor electrically connecting said first and second terminals and said third switch terminal in the absence of said electric field.

25. A microelectromechanical systems (MEMS) switch comprising:
   a deformable element comprising at least a first terminal and a first electrode on a first side of a gap;
   a second terminal;
   a second electrode on a second side of said gap configured to move said deformable element between a relaxed state and an actuated state based on a potential difference applied to said first and second electrodes to selectively connect said first and second terminals, the first terminal and the second terminal electrically connected when the deformable element is in the relaxed state.

26. The MEMS switch of claim 25, wherein said deformable element also comprises said second terminal.

27. The MEMS switch of claim 25, wherein the deformable element comprises a flexible layer and a plate attached to said flexible layer.

28. The MEMS switch of claim 27, wherein the plate comprises a contact conductor configured to selectively make electrical contact with each of the second terminal and a third terminal.

29. The MEMS switch of claim 28, wherein the contact conductor comprises protrusions at the points of electrical contact with each of the second terminal and the third terminal.

30. The MEMS switch of claim 28, wherein the plate further comprises the first electrode.

31. The MEMS switch of claim 30, wherein the contact conductor is electrically isolated from the first electrode.

32. The MEMS switch of claim 30, wherein the contact conductor and the first electrode are formed as a single conductor.

33. The MEMS switch of claim 25, wherein the first and second terminals are connected when a potential difference less than a threshold is applied.

34. A microelectromechanical systems (MEMS) switch comprising an element movable between first and second positions comprising first and second movable terminals, wherein the first and second movable terminals cooperatively move with the movable element to connect the first and second movable terminals when the element is in the first position and to disconnect the first and second movable terminals when the element is in the second position.

35. The MEMS switch of claim 34, wherein the switch comprises first and second electrodes, and wherein the movement between first and second positions is based on a voltage applied between the first and second electrodes.

36. The MEMS switch of claim 35, wherein the element is in the first position when the applied voltage between the electrodes is below a threshold.

37. A microelectromechanical systems (MEMS) switch comprising:
a deformable membrane moveable between a mechanically relaxed state and an actuated state;
first and second switch terminals;
means for maintaining electrical contact between said first and second switch terminals when said membrane is in the mechanically relaxed state; and
means for disconnecting the first and second switch terminals by applying a voltage difference to the MEMS switch greater than a threshold.

38. The MEMS switch of claim 37, wherein said means for maintaining electrical contact comprises a flexible layer that maintains a curved configuration in a mechanically relaxed state.

39. The MEMS switch of claim 38, wherein said means for disconnecting comprises at least one electrode associated with said flexible layer, and at least one other electrode.

40. A method of operating a microelectromechanical systems (MEMS) switch comprising a deformable membrane, the method comprising:
maintaining electrical contact between first and second switch terminals when said deformable membrane is in a mechanically relaxed state; and
disconnecting the first and second switch terminals by creating an electric field between a pair of electrode surfaces of the MEMS switch.

* * * * *

UNITED STATES PATENT AND TRADEMARK OFFICE
CERTIFICATE OF CORRECTION

PATENT NO.       : 7,724,993 B2
APPLICATION NO.  : 11/198925
DATED            : May 25, 2010
INVENTOR(S)      : Chui et al.

Page 1 of 1

It is certified that error appears in the above-identified patent and that said Letters Patent is hereby corrected as shown below:

On Title Page 2, Item (56) Line 15, change "Koehler et el." to --Koehler et al.--.

At Column 1, Line 24, change "and or" to --and/or--.

At Column 3, Line 51, change "switch" to --switch.--.

At Column 4, Line 8, change "detailed," to --detailed--.

At Column 7, Line 40, change "respectively" to --respectively.--.

At Column 8, line 67, change "ore" to --or--.

At Column 18, Lines 54-55, Claim 24, after "said first and second terminals" delete "and said third switch terminals."

Signed and Sealed this
Thirty-first Day of May, 2011

David J. Kappos
*Director of the United States Patent and Trademark Office*